Aug. 2, 1966 A. C. KIRILOUCKAS 3,263,937

REEL HOLDING UNIT

Filed Dec. 21, 1964 2 Sheets-Sheet 1

INVENTORS:
Albert C. Kirilouckas

By Keith D. Beecher

Attorney

REEL HOLDING UNIT

INVENTOR:
Albert C. Kiriloukas

By Keith D. Beecher
Attorney 3,263,937
Patented August 2, 1966

3,263,937

REEL HOLDING UNIT

Albert C. Kirilouckas, Granada Hills, Calif., assignor to Winston Research Corporation, Los Angeles, Calif., a corporation of California Filed Dec. 21, 1964, Ser. No. 419,796
6 Claims. (Cl. 242—68.3)

The present invention relates to the reel hold-down units for removably holding reels in place, and it relates more particularly to an improved hold down assembly for removably centering and clamping the pay-out or take-up reel of a magnetic tape recorder on their corresponding drive shafts.

It is usual in magnetic tape recorders for the magnetic tape to be wound upon reels, which, in the case of the large type instrumentation machines, for example, may have a relatively large diameter. Such a reel, when mounted in place on the magnetic tape recorder becomes the pay-out reel, and its tape is drawn through the machine and is rewound on a similar take-up reel.

It is important, of course, and especially in the high precision multi-channel instrumentation type of magnetic tape recorders, that the reels be held firmly and properly aligned with respect to their corresponding axes of rotation. It is also important that the reels may be readily released, so that they may be removed when desired.

An object of the present invention is to provide an improved reel hold-down unit for the pay-out reel or take-up reel of a magnetic tape recorder/reproducer; which is constructed releasably to clamp the reels firmly in place, properly centered on their corresponding drive shafts.

Another object of the invention is to provide such an improved reel hold-down unit which is readily adjustable, to permit the reel supported thereby to be released and removed.

Yet another object of the invention is to provide such an improved hold-down unit which may be simply and easily manipulated either to release its reel or to center and clamp its reel firmly in place and in precise coaxial relationship with its corresponding drive shaft.

Another object of the invention is to provide such an improved hold-down unit which is adaptable to support reels of different widths.

Other objects and advantages of the invention will become apparent from a consideration of the following specification, when the specification is taken in conjunction with the accompanying drawings, in which.

Figures 1, 2, 3, 4:
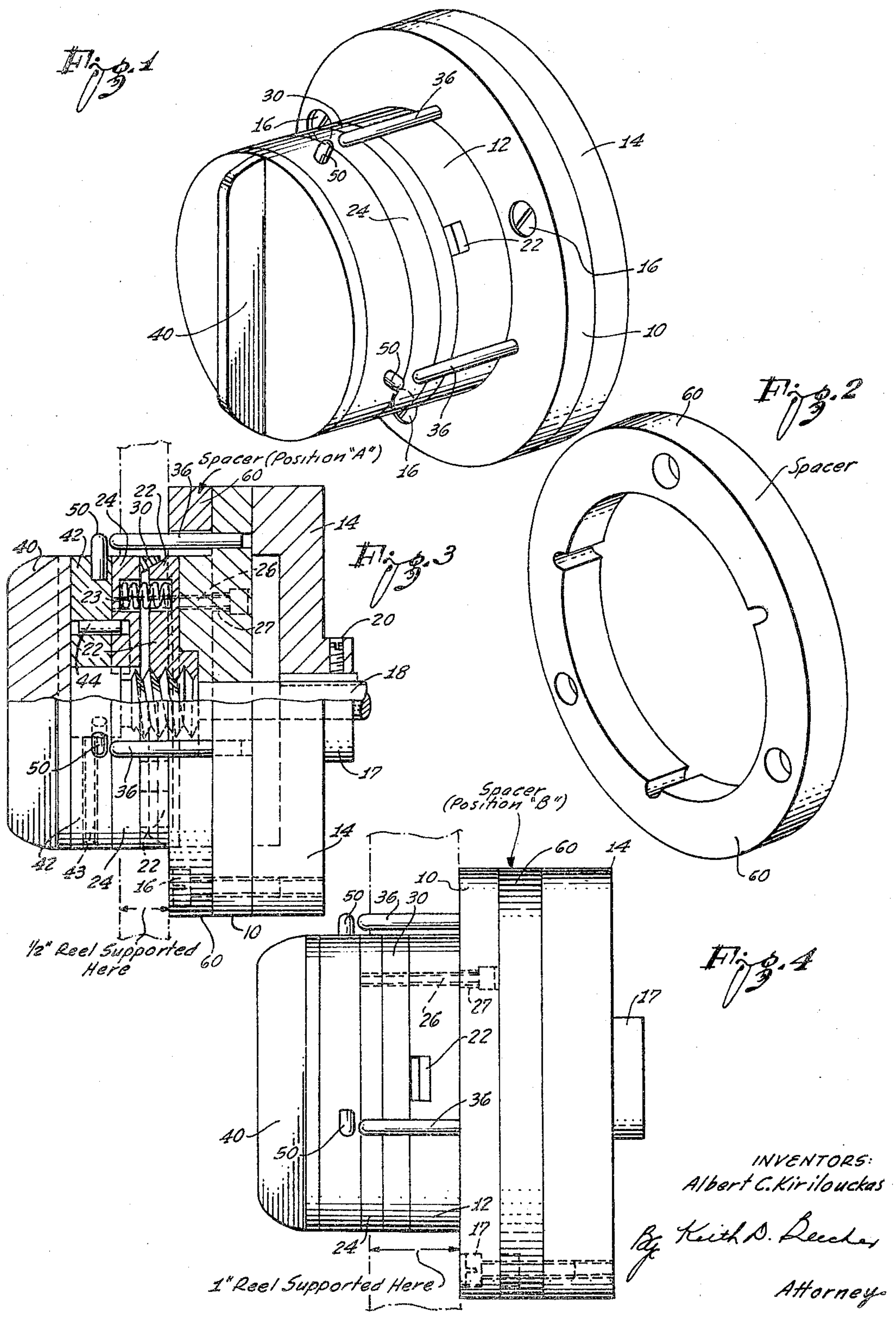
FIGURE 1 is a perspective view of an improved reel mounting and clamping assembly constructed in accordance with an embodiment of the invention.
FIGURE 2 shows, in perspective, a spacer ring which is incorporated into the assembly of FIGURE 1, so as to adapt the assembly to support reels of different widths.
FIGURE 3 is a side view of the assembly of FIGURE 1, partially in section, and with the spacer ring in a first particular position for relatively narrow reels.
FIGURE 4 is a side view of the assembly of FIGURE 3, with the spacer ring in a second position for relatively wide reels.

Referring now to the drawings, the unit constituting the illustrated embodiment of the invention includes a disc-like base 10 which has a hub portion 12. The base 10 is secured to a turntable 14 by screws, such as screws 16. The screws 16 extend through the base and into the turntable 14.

The turntable 14, as shown in FIGURES 3 and 4, for example, has a hub 17, and its hub is keyed to a drive shaft 18 by means, for example, of a set screw 20. It will be appreciated, therefore, that as the drive shaft 18 rotates, the turntable 14 also rotates, causing the base 10 to rotate. The base 10 is mounted on the turntable 14 with its hub portion 12 disposed on the side of the base remote from the turntable.

Figure 5:
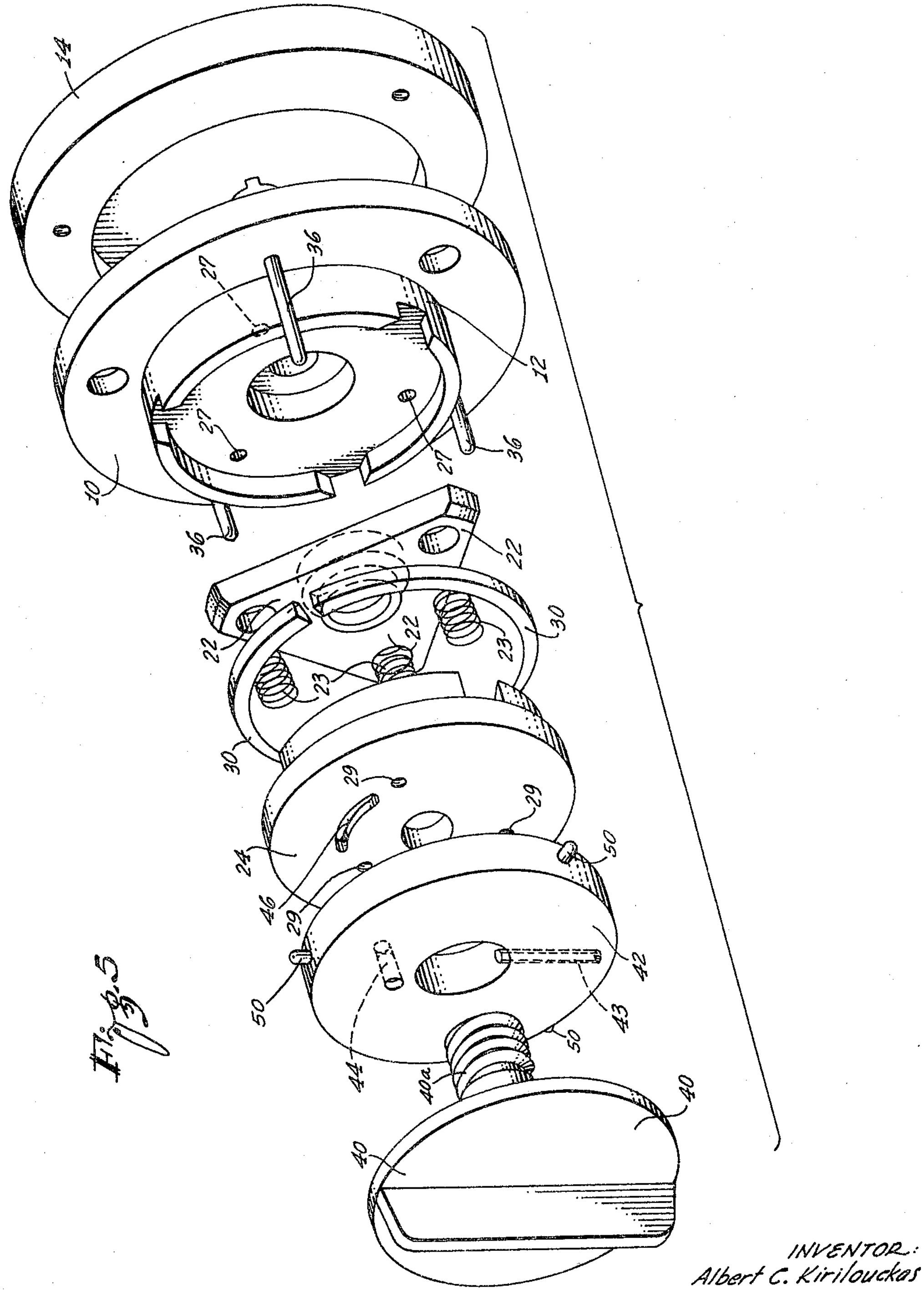
FIGURE 5 is a perspective exploded view, illustrating the various components which make up the assembly of FIGURE 1.

A cam 22 is supported by the base 10, in the hub portion 12 thereof. The cam is spring biased against the base by springs 23 which are seated in the cam. A retaining disc 24 is also supported on the base, the retaining disc being so supported by three screws, such as the screw 26 (FIGURE 3). The screws 26 extend through holes 27 (FIGURE 5) in the base 10 and are threaded into aligned holes 29 in the retaining disc 24.

The cam 22 is sandwiched between the retaining disc 24 and the hub 12 for limited reciprocal longitudinal movement. However, rotational movement of the cam 22 relative to the hub portion 12 and to the retaining disc 24 is restrained by the inner configuration of the hub and of the retaining disc.

A resilient spilt ring 30 is positioned between the retaining disc 24 and the cam 22, and the inner periphery of the split ring engages the cam so that the ring expands and contracts radially as the cam 22 is moved back and forth longitudinally between the hub portion 12 and the retaining member 24. In this manner, the retaining ring 30 may be moved against the inner peripheral surface of a reel supported on the hub portion 12 and extending over the ring 24, so as to clamp the reel firmly in place on the unit and properly positioned in precise coaxial relationship with the axis of rotation.

A plurality of keying pins 36 are mounted on the base, and these pins extend from the base longitudinally adjacent the hub 12. The keying pins 36 engage slots in the inner periphery of the tape reel supported on the assembly, so as to key the reel to the unit.

A knob 40 has a shaft **40*a* which extends through a central hole in the retaining disc 24 and is threaded into a threaded hole in the center of the cam 22. Therefore, as the knob 40 is rotated in either direction, it causes the cam 22 to move back and forth longitudinally against the force of the springs 23**.

A stop disc 42 is keyed to the shaft **40*a* by means, for example, of a set screw 43. Therefore, the stop disc 42 rotates with the knob 40. The amount of rotation of the knob and stop disc is limited by a stop member 44 which extends from the stop disc 42 into an arcuate slot 46 in the retaining disc 24**.

A plurality of retaining pins 50 are mounted on the stop disc, and these pins may be moved into alignment with the pins 36 to permit the reel to be mounted on the unit, or removed therefrom.

When the reel is in place, the knob 40 may be turned to cause the cam 22 to move away from the base 10 against the springs 23 so as to expand the ring 30 into its clamping position; and at the same time the pins 50 are moved out of alignment with the pins 36 and serve to retain the reel on the unit.

Then, when the knob 40 is turned back to its original angular position, the pins 50 again line up with the pins 36; and at the same time the cam 22 is moved back against the base 10 to return the resilient ring 30 to its unclamping position so that the reel may be remaved.

A spacer ring 60, may be provided, as shown in FIGURE 2. This ring may be between the base 10 and the supported reel (FIGURE 3) for a narrow reel, so as to permit a narrow reel (for example, a half-inch reel) to be supported on the assembly. Conversely, the spacer ring 60 may be mounted between the base 10 and the turntable 14, to permit a wider reel, for example, a one-inch reel to be mounted on the unit.

It will be observed that in each instance, the left hand edge of the two reels in FIGURES 3 and 4 has the same position, regardless of whether the unit is adapted for the half-inch reel or for the one-inch reel. This provides for both sizes of reels to be positioned properly by the unit, against the face of the recorder mechanism in which they are mounted.

The invention provides, therefore, an improved assembly for removably clamping the reels of a tape recorder, or the like, on their respective turntables. The assembly of the invention is advantageous in that it is capable of firmly supporting the reels in precise coaxial relationship with the axes of rotation of the respective turntables, and yet provides for the easy removal of the reels, merely by turning the appropriate knobs.

While a particular embodiment of the invention has been shown, modifications may be made. The following claims are intended to cover all the modifications which fall within the scope of the invention.

What is claimed is:

1. A hold-down unit for a reel, or the like, including: a base; a cam member mounted on said base and supported thereby for limited longitudinal movement and restrained thereby for relative rotation with respect thereto; a retaining disc member mounted on said base adjacent the side of said cam member remote from said base; a resilient ring member supported in engagement with said cam member between said disc member and said base and adapted to expand and contract radially upon the aforesaid limited longitudinal movement of said cam member, said ring serving to clamp against the inner peripheral surface of the bore of a tape reel, or the like, supported on the unit; and a knob member having a shaft extending through said retaining disc and coupled to said cam to produce said limited longitudinal movement of said cam upon rotation of said knob member.

2. A reel hold-down unit including: a disc-like base having a hub portion adapted to extend into the bore of a tape reel, or the like, supported on the unit; a cam member mounted on said base and supported thereby in said hub portion for limited longitudinal movement with respect to said base and restrained thereby for relative rotational movement with respect to said base; a retaining disc member mounted on said base adjacent the side of said cam member remote from said base; a retaining ring member disposed between said retaining disc member and said hub portion of said base in engagement with said cam member and adapted to expand and contract radially upon the aforesaid limited longitudinal movement of said cam member, said ring serving to clamp against the inner peripheral surface of the bore of a tape reel supported on the unit; and a knob member having a shaft extending through said retaining disc and threaded into said cam to produce said limited longitudinal movement of said cam upon rotation of said knob member.

3. A hold-down unit for centering and clamping a tape reel upon a rotatable turntable which, in turn, is adapted to be mounted on a drive shaft, said mounting unit including: a disc-like base having a hub portion adapted to extend into the bore of a tape reel supported on the unit; means for mounting said base on said turntable in coaxial relationship therewith to be rotated thereby and with said hub portion disposed on the side of said base remote from said turntable; a cam member mounted on said base and supported thereby in said hub portion for limited longitudinal movement with respect to said base and restrained by said base from relative rotational movement with respect thereto; a retaining disc member mounted on said base and affixed thereto adjacent the side of said cam member remote from said base; a split resilient ring member interposed between said retaining disc member and said hub portion of said base in engagement with said cam member and adapted to expand and contract radially upon the aforesaid limited longitudinal movement of said cam member; said ring serving to clamp against the inner peripheral surface of the bore of a tape reel supported on the hub portion of said base; and a knob member having a shaft extending through said retaining disc and threaded into said cam member to produce said limited longitudinal movement of said cam member upon rotation of said knob member.

4. The tape reel hold-down unit defined in claim 3 and which includes a stop disc keyed to said shaft of said knob and interposed between said knob and said retaining disc in engagement with said retaining disc, one of said last-mentioned two discs having a longitudinally extending stop member extending into an arcuate slot in the other of said discs.

5. A tape reel mounting unit for holding a tape reel upon a rotatable turntable which, in turn, is adapted to be mounted on a drive shaft, said mounting unit including: a disc-like base having a hub portion adapted to extend into the bore of a tape reel supported on the unit; means for mounting said base on said turntable in coaxial relationship therewith to be rotated thereby and with said hub portion being disposed on the side of said base remote from said turntable; a plurality of reel-keying pins mounted on said base at spaced angular positions thereon and extending longitudinally adjacent the peripheral surface of said hub portion; a cam member mounted on said base and supported thereby in said hub portion for limited longitudinal movement with respect to said base and restrained by said base from relative rotational movement with respect thereto; a retaining disc member mounted on said base and affixed thereto adjacent the side of said cam remote from said base; a split resilient ring member interposed between said retaining disc member and said hub portion of said base in engagement with said cam member and adapted to expand and contract radially upon the aforesaid limited longitudinal movement of said cam member, said ring serving to clamp against the inner peripheral surface of the bore of a tape reel supported on the unit; a knob member having a shaft extending through said retaining disc and threaded into said cam member to produce said limited longitudinal movement of said cam upon rotation of said knob member; and a stop disc keyed to said shaft of said knob and interposed between said knob and said retaining disc in engagement with the surface of said retaining disc, said stop disc having a longitudinally extending stop member extending into an arcuate slot in said retaining disc and also having radial reel-retaining pins positioned to be moved angularly in and out of angular alignment wtih said reel-keying pins as said knob is rotated.

6. The tape reel mounting unit of claim 3 and which includes a spacer unit adapted to be mounted on the hub portion of said base between the reel supported on the unit and said base for one reel width; and to be mounted between said base and said turntable for a second reel width.

References Cited by the Examiner

UNITED STATES PATENTS

| | | | |
|---|---|---|---|
| 2,983,460 | 5/1961 | Wright | 242—68.3 |
| 3,124,319 | 3/1964 | Cohen et al. | 242—68.3 |

FRANK J. COHEN, *Primary Examiner.*

MERVIN STEIN, *Examiner.*

N. L. MINTZ, *Assistant Examiner.*